United States Patent
Tenn

(10) Patent No.: US 6,481,772 B1
(45) Date of Patent: Nov. 19, 2002

(54) VEHICLE HAVING A FOLDABLE SEAT WITH A RETRACTABLE WINDOW AND AN EXTENDING CARGO BED

(75) Inventor: Peter Tenn, Cherry Hill, NJ (US)

(73) Assignee: Subaru of America, Inc., Cherry Hill, NJ (US)

( * ) Notice: Subject to any disclaimer, the term of this patent is extended or adjusted under 35 U.S.C. 154(b) by 0 days.

(21) Appl. No.: 09/689,614

(22) Filed: Oct. 13, 2000

Related U.S. Application Data

(60) Provisional application No. 60/159,568, filed on Oct. 15, 1999, and provisional application No. 60/174,378, filed on Jan. 4, 2000.

(51) Int. Cl.$^7$ .............................................. B62C 1/04
(52) U.S. Cl. ................. 296/26.11; 296/37.6; 296/63; 296/65.01; 296/146.16
(58) Field of Search .................... 296/10, 26.08, 296/26.01, 37.6, 39.2, 63, 65.01, 66, 69, 146.16, 183

(56) References Cited

U.S. PATENT DOCUMENTS

| | | | |
|---|---|---|---|
| 2,140,968 A | * 12/1938 | Paranzino | 296/24.1 |
| 2,152,505 A | * 3/1939 | Stuart et al. | 296/65.09 |
| 2,602,691 A | 7/1952 | Doty | 296/66 |
| 2,632,668 A | 3/1953 | Keller | |
| 2,777,531 A | 1/1957 | Erickson | 180/82 |
| 3,310,342 A | 3/1967 | Drelichowski | 297/395 |
| 3,328,069 A | 6/1967 | Dumas | 296/66 |
| 3,328,070 A | 6/1967 | Jermain, Jr. | 296/66 |
| 3,703,310 A | 11/1972 | Lystad | 296/10 |
| 3,729,224 A | 4/1973 | Hathaway, Jr. | 296/23 MC |
| 3,770,312 A | 11/1973 | Shadburn | 296/28 C |
| 4,119,341 A | 10/1978 | Cook | 296/146 |
| 4,215,898 A | * 8/1980 | Ulics | 296/183 |
| 4,249,754 A | 2/1981 | Best | 280/751 |
| 4,480,868 A | 11/1984 | Koto | 296/190 |
| 4,592,583 A | * 6/1986 | Dresen et al. | 296/39.2 |
| 4,699,418 A | 10/1987 | Plavetich | 296/65.09 |
| 4,738,480 A | 4/1988 | Ward | 296/24 R |
| 4,930,838 A | 6/1990 | Brabant | 297/184 |
| 4,941,702 A | 7/1990 | Southward | 296/37.6 |
| 5,288,124 A | * 2/1994 | Ward | 296/183 |
| 5,308,133 A | * 5/1994 | Mangum et al. | 296/39.2 |
| 5,449,212 A | * 9/1995 | Seifert | 296/57.1 |
| 5,524,951 A | 6/1996 | Johnson | 296/37.6 |
| 5,588,692 A | * 12/1996 | Gandhi et al. | 296/146.7 |
| 5,658,046 A | 8/1997 | Rus | 297/378.1 |
| 5,702,145 A | 12/1997 | Fowler et al. | 296/66 |
| 5,707,108 A | 1/1998 | Pi | 297/230.14 |
| 5,810,416 A | 9/1998 | Hashimoto | 296/65.01 |
| 5,887,931 A | * 3/1999 | Bills et al. | 296/39.1 |
| 5,934,727 A | * 8/1999 | Storc et al. | 296/26.1 |
| 5,967,584 A | * 10/1999 | McCarthy et al. | 296/37.16 |
| 6,073,986 A | * 6/2000 | Neale et al. | 296/63 |
| 6,186,575 B1 | * 2/2001 | Fisher et al. | 296/100.03 |
| 6,217,096 B1 | * 4/2001 | Koiwa et al. | 296/24.1 |
| 6,260,916 B1 | * 6/2001 | Hunt | 296/190.11 |

* cited by examiner

Primary Examiner—Joseph D. Pape
Assistant Examiner—D. Glenn Dayoan

(57) ABSTRACT

An automotive vehicle body including a passenger cab having a rear end, a cargo bed having a substantially horizontal floor extending rearwardly from the rear end of the passenger cab and a pivoted closure on the rear end of the cab. The closure is movable between an erect position to separate the passenger cab and the cargo bed, and a folded position to extend the floor of the cargo bed into the rear end of the passenger cab. In one embodiment, the pivoted closure is defined by a rear seat back in the passenger cab and that is capable of folding in a forward direction of the vehicle. A retractable window is slidable into and out of a top portion of the rear seat back when the rear seat back is in an upright position. In another embodiment, the pivoted closure is provided by a hinged door between the rear end of the passenger cab and the cargo bed.

11 Claims, 10 Drawing Sheets

VEHICLE HAVING A FOLDABLE SEAT WITH A RETRACTABLE WINDOW AND AN EXTENDING CARGO BED

CROSS-REFERENCE TO RELATED APPLICATIONS

This application claims priority under 35 U.S.C. § 119 based on provisional application Ser. No. 60/159,568, filed Oct. 15, 1999 and on provisional application Ser. No. 60/174,378, filed Jan. 4, 2000.

BACKGROUND OF THE INVENTION

1. Field of the Invention

This invention relates to automotive vehicles having a passenger cab and an open rear cargo bed, and, more particularly, to a convertible rear seat and cab closure for such vehicles.

2. Description of the Related Art

The current popularity of pick-up trucks can be attributed in substantial measure to the facility provided by the open top cargo bed of such vehicles to receive and carrying diverse types and shapes of cargo. Although traditionally, pick-up trucks have been equipped with a single seat passenger cab, it is now common for such vehicles to be provided with an extended cab to accommodate a rear passenger seat. However, the extended length of the cab either compromises the length of the cargo bed or increases the overall length of the vehicle. Also, pick-up trucks generally are designed with emphasis on load-carrying capacity and for that reason, employ a relatively heavy truck chassis that results in reduced passenger comfort from the standpoint of riding characteristics, increased fuel consumption, and other passenger discomforts as compared with a typical passenger sedan, for example.

In the past, single seat vehicles with open top cargo beds have been built on chassis essentially the same as those used on passenger cars of the same vintage. Although it is not known whether such vehicles have employed the equivalent of an extended cab to allow room for a rear passenger seat, it is apparent that such an increase in passenger accommodation would result in the same compromises associated with extended cabs in pick-up trucks.

Therefore, there is a need for automotive vehicles having a passenger cab and open top cargo bed and which may accommodate a rear seat in the passenger cab while, at the same time, preserving a capability for cargo bed length corresponding to that of a single seat passenger cab.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the invention is directed to an automotive vehicle body comprising a passenger cab having a rear end and a cargo bed having a substantially horizontal floor extending rearwardly from the rear end of the passenger cab. A pivoted closure is provided on the rear end of the cab, the closure being movable between an erect position to separate the passenger cab and the cargo bed, and a folded position to extend the floor of the cargo bed into the rear end of the passenger cab.

In another aspect, the automotive vehicle of the invention includes a vehicle body, a rear seat including a seat back and a seat bottom, and a retractable window. The vehicle body includes a substantially horizontal bed. The rear seat back is capable of folding in a forward direction of the vehicle. The retractable window is configured to extend in and out of a top portion of the rear seat back upon actuation of a window operating mechanism when the rear seat back is in an upright position.

In another aspect, the invention comprises a passenger seat of a vehicle. The passenger seat includes a seat back, a retractable window, and a seat bottom. The seat back has a front, top and back surface, and is pivotable in a forward direction of the vehicle. The retractable window is configured to extend from and retract into the top surface of the seat back. The seat bottom is also pivotable in a forward direction of a vehicle.

In a further aspect, the invention comprises a rear portion of the passenger compartment of a vehicle. The rear portion of the passenger compartment includes a back wall and a retractable window. The back wall has a front, top and back surface, and is pivotable in forward direction of the vehicle. The retractable window is configured to extend from and retract into the top surface of the back wall.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

DESCRIPTION OF THE PREFERRED EMBODIMENT

Figure 1:
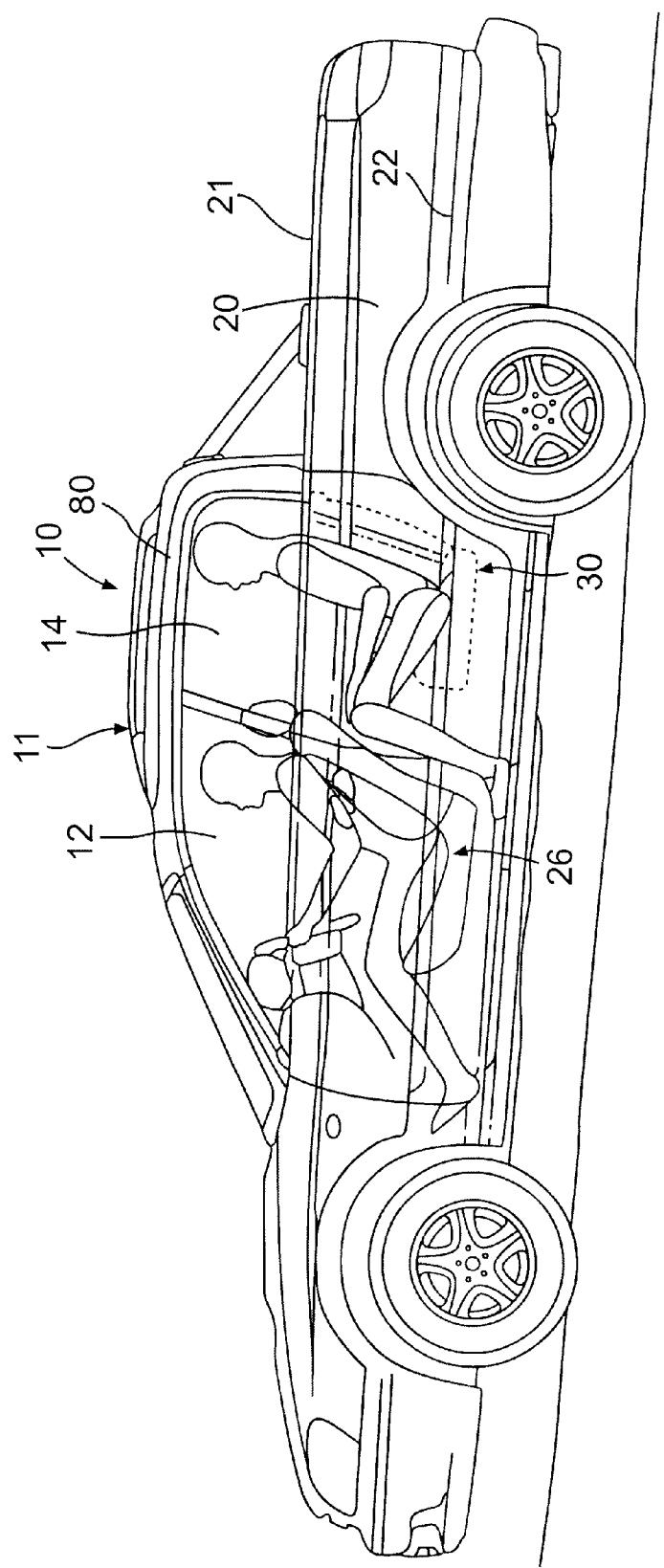
FIG. 1 is a side view of a vehicle according to the invention.

Reference will now be made in detail to the present preferred embodiment of the invention, an example of which is illustrated in the accompanying drawings. Wherever possible, the same reference numbers will be used throughout the drawings to refer to the same or like parts.

In accordance with the present invention, the vehicle includes a passenger cab and a cargo bed extendable into the passenger cab via an opening closure normally separating the cab and cargo bed. As embodied herein and shown in FIGS. 1–6, a vehicle 10 is provided in the form of a hybrid truck/car. In a hybrid type of vehicle such as that shown, the vehicle may be manufactured on a car platform, instead of a truck platform. The vehicle 10 has a passenger cab 11 with a front passenger area 12 having a front seat 26 and a rear passenger area 14 having a rear seat 30.

Figure 2:
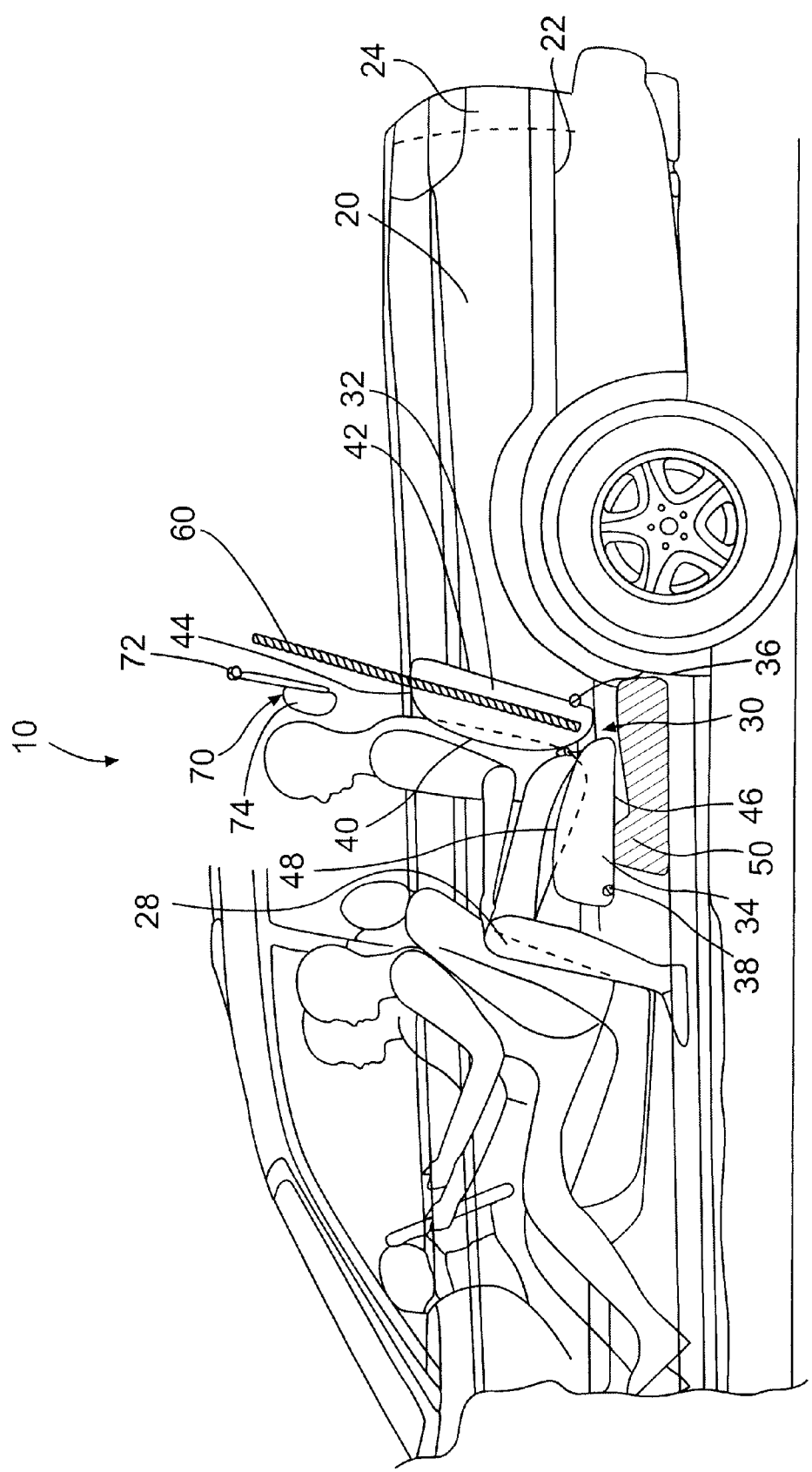
FIG. 2 is a partial sectional side view of the vehicle of FIG. 1 with a rear seat back in an upright position and a retractable window in an extended position.

The vehicle further includes a cargo bed 20 similar to that found in a pick-up truck. The cargo bed 20 is defined by a bottom floor surface 22 and the side walls 21 extending from the rear of the passenger cab 11. As best seen in FIGS. 1 and 2, the front wall of cargo bed 20 is defined by the rear of the passenger cab 11 as will be described in greater detail below. The back wall of the truck bed is defined by a tail gate 24 or other similar structure. Alternately, the tail gate could be removed to expose an open back portion of the cargo bed 20.

The front seat 26 is similar to that found in most passenger vehicles, with the exception of the scallops or grooves 28 for the rear passengers' knees that may be provided with the present invention. The details of the scallops and grooves will be described in more detail below. The rear seat 30 of the vehicle includes a rear seat back 32 and a rear seat bottom 34. The rear passengers back rests against the rear seat back 32 of the vehicle. The rear seat back 32 is supported on a first pivot point, defined by pins or a rod 36 in the illustrated embodiment, for pivotal movement between the erect position and the folded position whereas the rear seat bottom 34 is configured to be pivotable about second pivot point defined by pins or a rod 38 in the illustrated embodiment. Rear seat back 32 includes a front surface 40, rear surface 42 and a top portion 44. The rear seat back is shown as being slightly curved at the top, however, any variety of suitable sizes and shapes may be used with the present invention.

The rear seat bottom 34 includes a first surface 46 and second surface 48. In the position shown in FIG. 2, the passenger sits on the second surface 48 of the rear seat bottom 34, while the first surface 46 rests against a base, such as the cross beam 50, of the vehicle. The rear seat bottom 34 can be folded forward and upward, by pivoting about pivot point 38.

As can be seen in FIG. 2, the seat back 32 of the rear seat 30 is positioned forward of the original seat back position of a conventional automobile. In one embodiment, the rear seat is positioned approximately 7 inches forward of the conventional position. The forward positioning of the rear seat helps to create a longer cargo bed length than conventional hybrid vehicles, even without folding the rear seat back forward. The forward positioning of the seat decreases the leg room of the rear passenger, however. In order to compensate for the decrease in leg room, scallops or grooves 28 may be provided in the back of the front seat for the knees of the rear seat occupant. The grooves 28 are sized and shaped to be slightly larger than the knees of a typical back seat occupant.

The rear seat further includes a retractable window 60 for retracting into and extending out of the top portion 44 of the rear seat back 32. The retractable window 60 serves as the back window of the passenger cab 11. The retractable window can be made out of any of the conventional materials known in the art such as glass or plexiglass. The window 60 may also be provided with defroster wires. The rear glass window is configured inside the rear seat back in a manner that is similar to car doors, or rear windows in station wagons. In one embodiment, the window is powered by a motor that may be positioned in the rear seat back or elsewhere. Alternately, the window could be manually operated by a handle in a manner similar to a manual door window. In another embodiment, the rear window could be retracted into the rear seat back 32 by pressing or pulling on the latch, and allowing the window to slide into the rear seat back by its own weight or by providing an external force.

When the window is extended as shown in FIG. 2, the window forms a seal with the vehicle roof 80 and sides. A gasket such as those provided for conventional windows may be used to provide the seal. The rear surface 42 of the rear seat back also serves as the front vertical wall of the cargo bed, therefore, it is important that the rear seat back, and especially the rear surface 42 is constructed of sturdy material. One material that has been found to be especially suitable is fiberglass reinforced plastic. Other materials may include a variety of metals such as aluminum and steel, hard rubbers, or composite materials.

Figure 3:
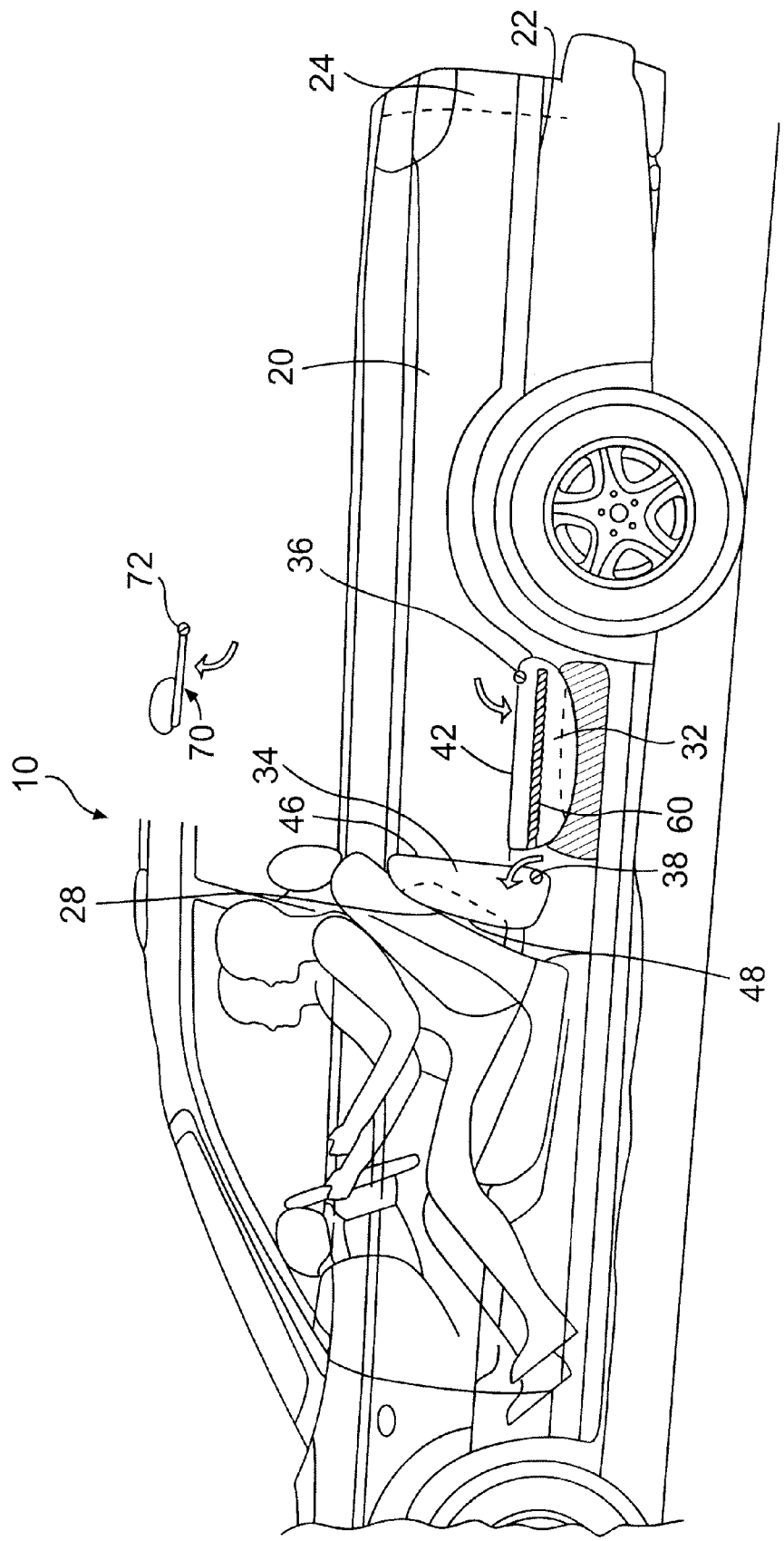
FIG. 3 is a partial sectional side view of the vehicle of FIG. 1 with the rear seat back in a folded downward position and the retractable window in a retracted position.

When the window is retracted into the seat, and the rear seat is folded forward, as shown in FIG. 3, the size of the cargo bed is significantly increased. This provides for increased cargo space and a bed length that is competitive with typical conventional cargo beds found in pick-up trucks. In one embodiment, one particularly advantageous feature is that the rear surface 42 of the rear seat back is substantially flush with the surface 22 of the flat bed. Because the surfaces are flush, the extended cargo bed can be used in a manner similar to a conventional truck bed.

In one embodiment, as best shown in FIG. 2, a head rest 70 is provided that pivots about head rest pivot point 72 on the vehicle roof 80. The head rest includes a cushion 74 for resting against the rear passenger's head. Typically, a plurality of head rests 70 will be provided in the back seat passenger area, the number of head rests typically corresponding to the number of passengers that the back seat is suitable for handling, for example, two or three. In this embodiment, the individual head rests may move independently or together. Alternately, a single wider head rest could be provided to be shared by the rear passengers. In a preferred embodiment, head rest 70 may pivot forward, as shown in FIG. 3, and fits into a recess (not shown) in the vehicle roof 80 so that it is flush with the roof. If the head rest were provided on the rear seat back, it would interfere with the seat bottom when it is folded forward as shown in FIG. 3. While the head rest is typically manually operated, it may alternately be electrically actuated in one or both directions.

Figure 4:
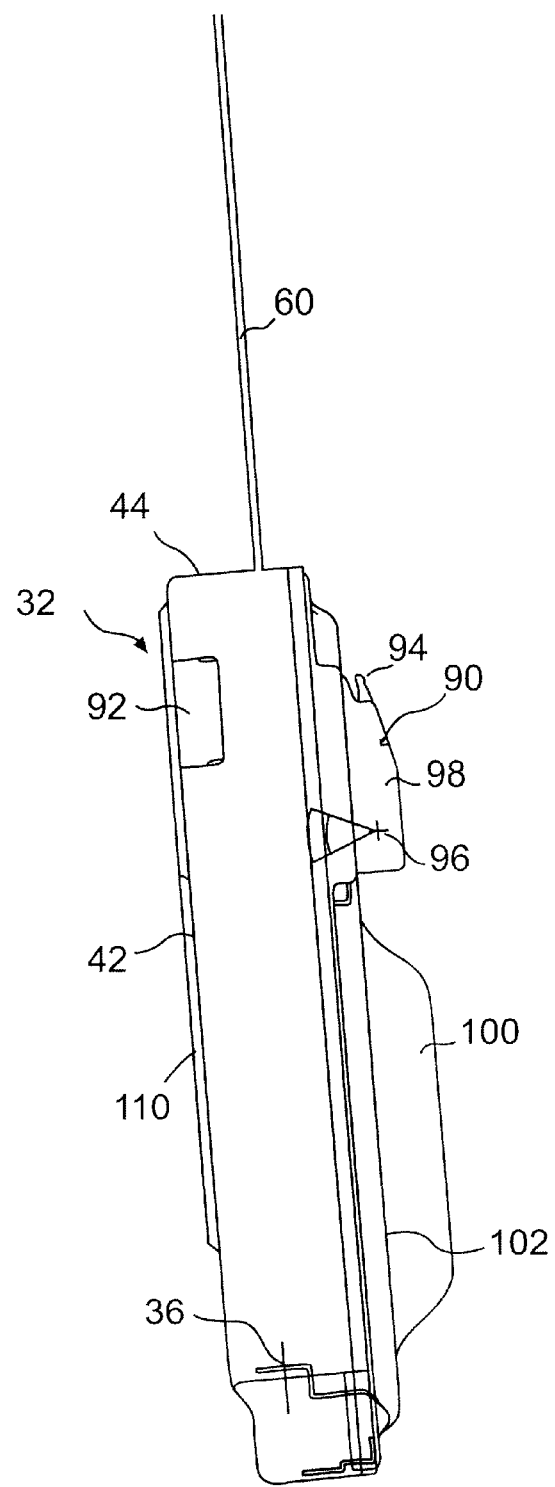
FIG. 4 is a side view of the rear seat back of the vehicle of FIG. 1.
Figure 5:
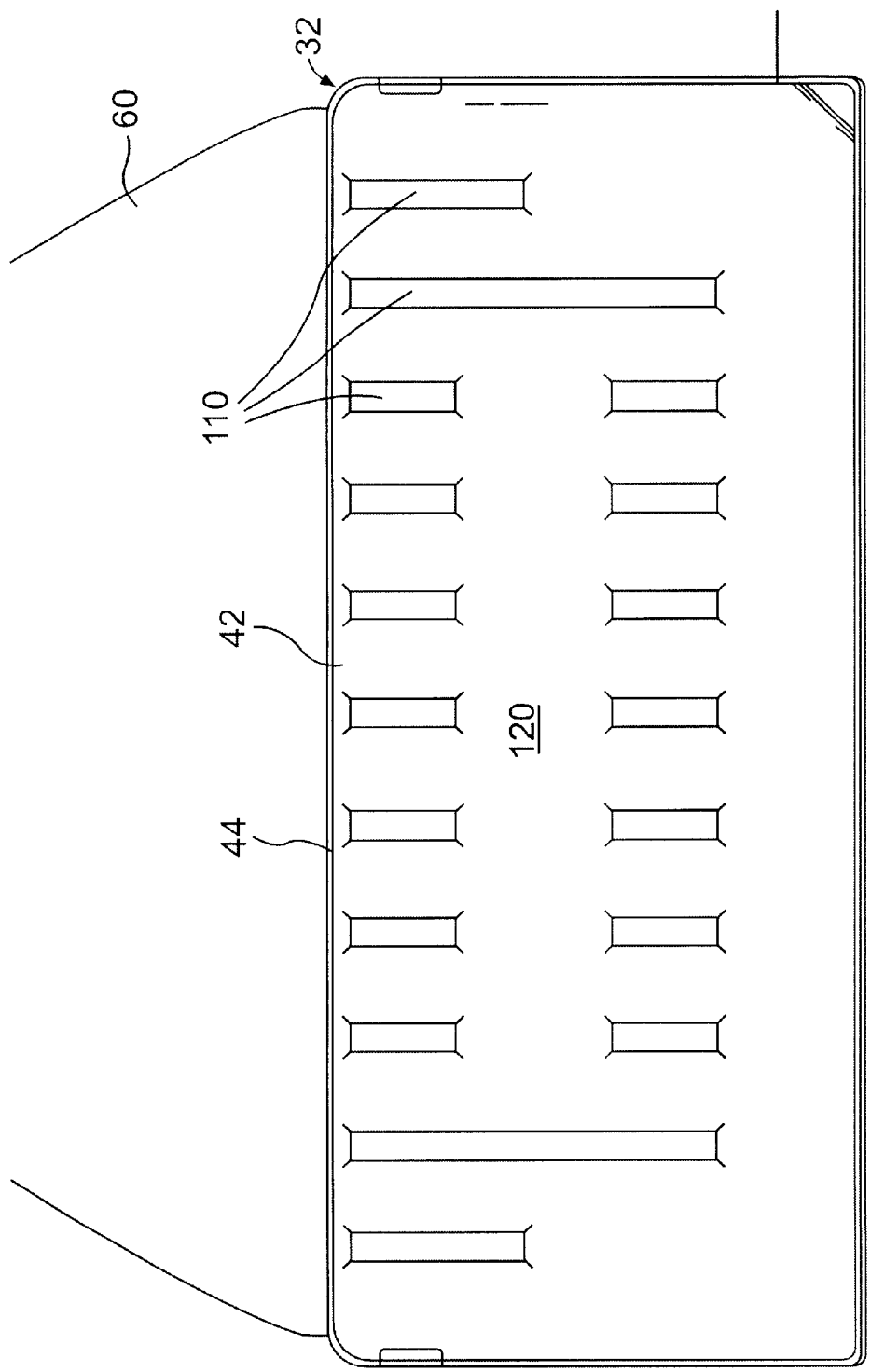
FIG. 5 is a rear view of a rear surface of the rear seat back of FIG. 4.
Figure 6:
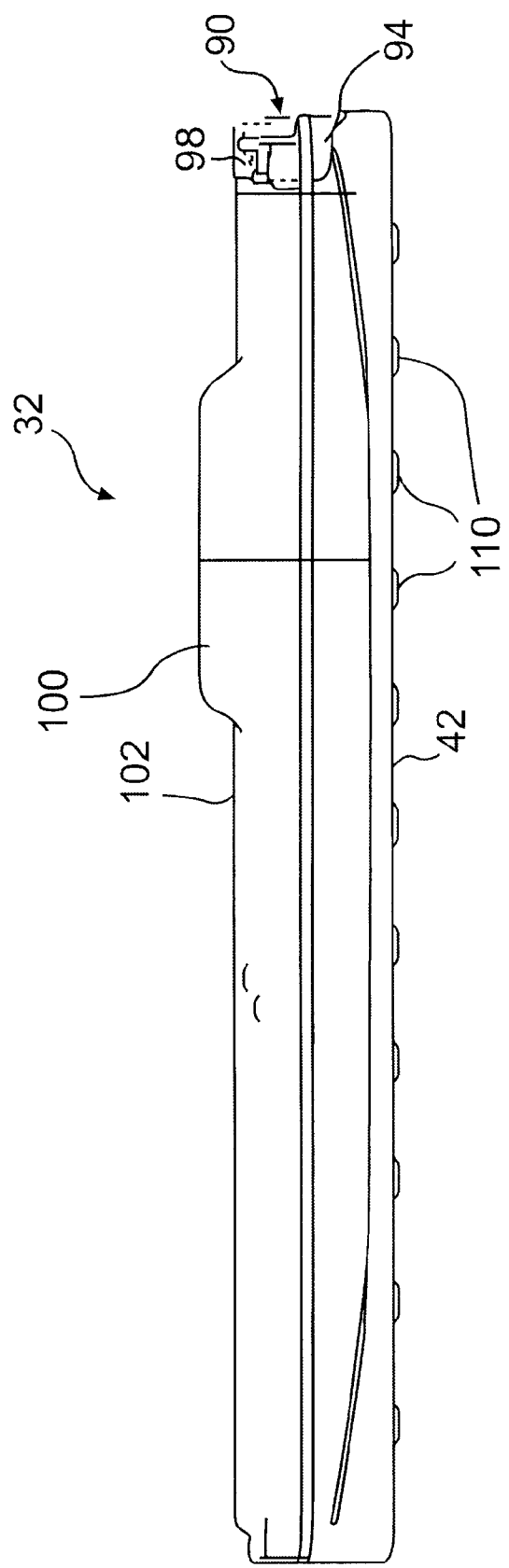
FIG. 6 is a top view of the rear seat back of FIG. 4.
Figure 7:
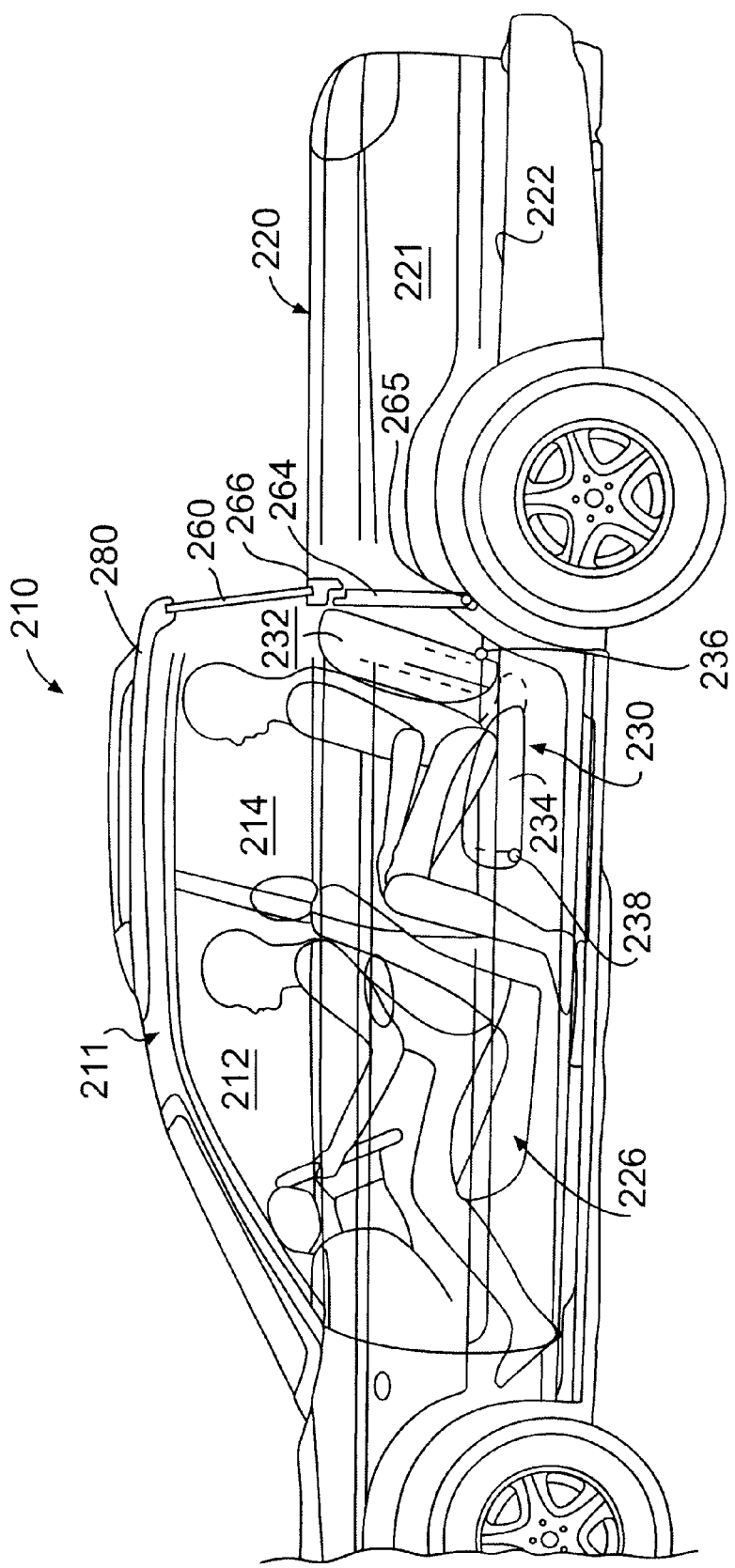
FIG. 7 is a partial sectional side view of an alternative vehicle embodiment with a rear seat back in an upright position.
Figure 8:
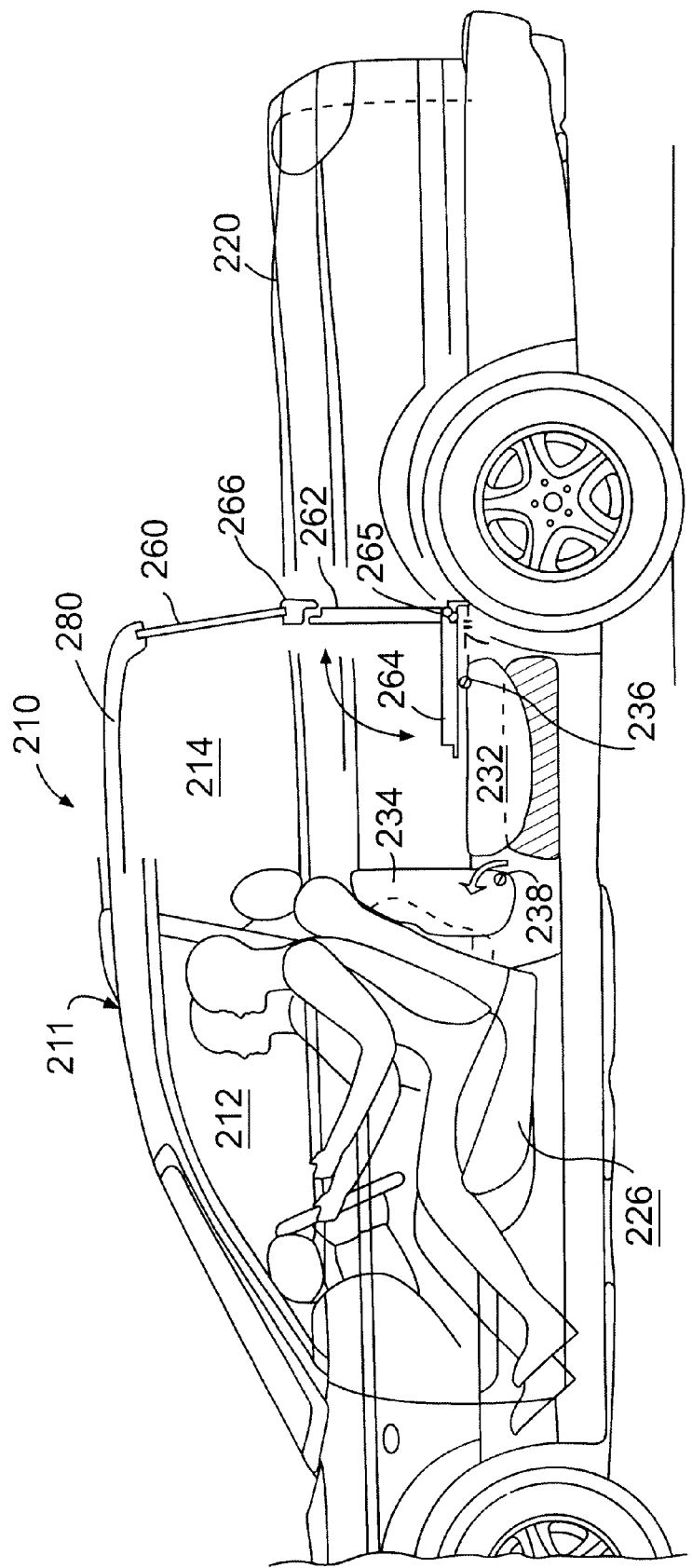
FIG. 8 is a partial sectional side view of the vehicle of FIG. 7 with the rear seat back in a folded downward position and a hinged rear door in an open position.
Figure 9:
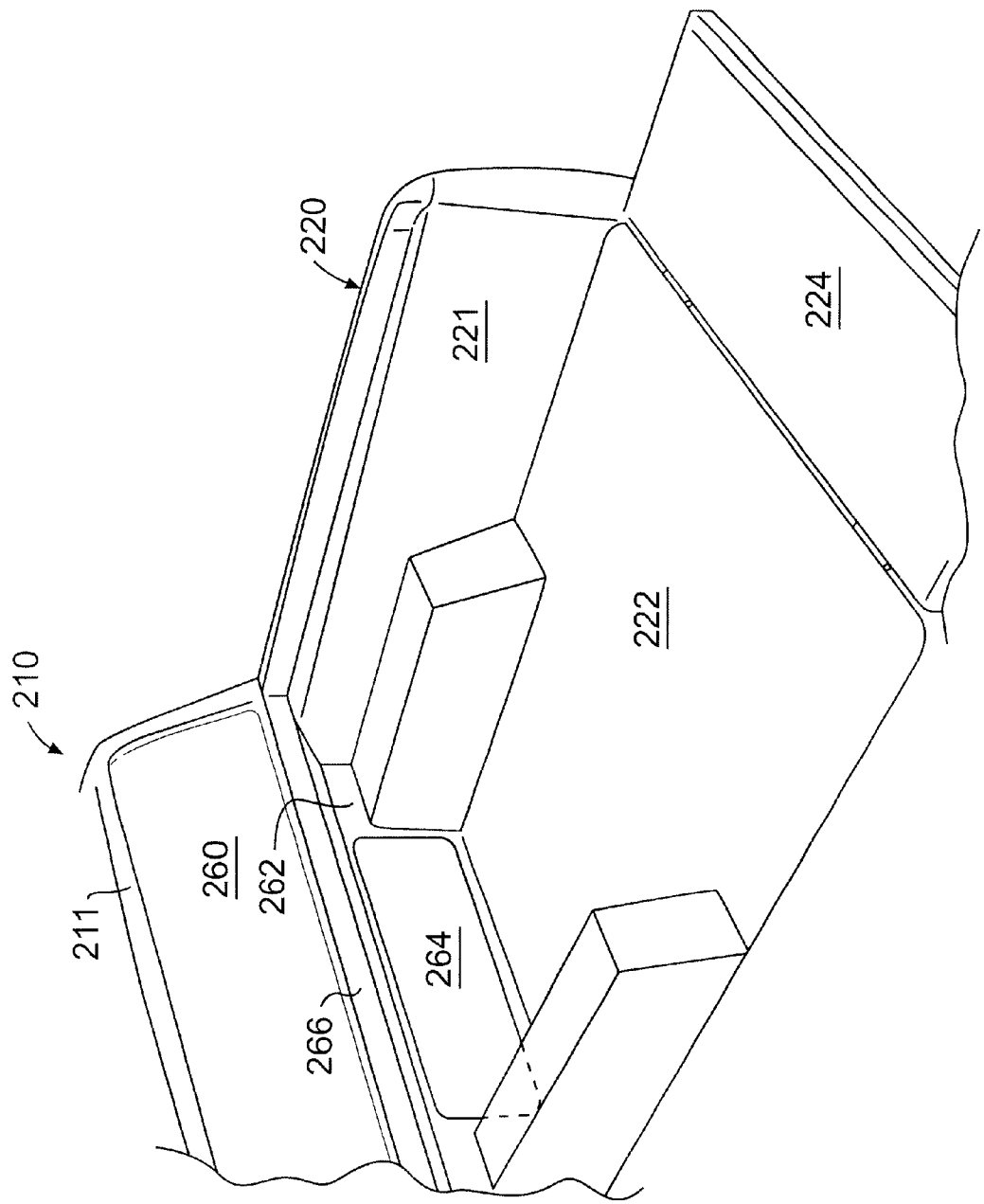
FIG. 9 is a perspective view showing the cargo bed of the vehicle of FIG. 7 with the hinged rear door in a closed position.

Additional details of the rear seat and retractable window for one embodiment of the present invention are shown in FIGS. 4–6. As embodied herein and shown in FIGS. 4–6, the rear seat back 32 includes at least one lever mechanism 90 for manual actuation of a latch mechanism 92 for locking or unlocking the rear seat back in a first (upright) position. The lever mechanism 90 includes a manual lever 94 or handle for manipulation by the passenger in the rear seat of the vehicle. The manual lever 94 pivots about pivot 96 when it is pulled by an operator. When the rear seat back 32 is in the upright locked position, the lever 94 will remain in the position shown in FIG. 4. In the upright position shown in FIG. 4, the latching mechanism 92 engages with a corresponding member (not shown) on the vehicle body. In one typical embodiment, a bolt of the latching mechanism is projected into the corresponding member on the vehicle body. This type of latching mechanism is similar to those utilized in car doors.

When the operator desires to fold the rear seat back to a forward position to extend the cargo bed, the operator should first put the rear window 60 in a retracted position in the rear seat back 32, and then pull down on the lever 94 so that it pivots in a clockwise direction about pivot 96. The lever is typically connected to the latching mechanism 92 by a cable or rod in order to actuate the latching mechanism. As the lever 94 is pulled down (in a clockwise direction in FIG. 4), the latching mechanism 92 will become disengaged from the corresponding member on the vehicle body so that the rear seat back may be pivoted forward (clockwise in FIG. 4) about first pivot point or hinge 36. By pivoting the rear seat back to a second folded position, the cargo bed may be extended as discussed previously.

In the embodiment shown in FIGS. 4–6, portions of the lever mechanism are contained within a lever housing 98. The lever housing 98 aids in preventing fingers or other small objects from being inserted into the lever and also prevents contamination to or from the lever. Although only one lever mechanism is shown in FIGS. 4–6, the present invention is equally suitable for use with a plurality of such lever mechanisms. In an arrangement with two lever mechanisms, a lever mechanism is provided on each side of the rear seat back, instead of on just one end as shown in FIG. 6. If more than one lever mechanism is provided, the vehicle seat back may be folded down by an operator that is on either the left or right side of the vehicle.

The rear seat back design of the present invention includes a number of other features. For example, the rear seat back 32 in one embodiment shown in FIGS. 4–6 includes a motor housing 100 for housing the motor used to drive the window 60 into and out of the rear seat back. The rear seat back typically includes cushions on the front side 102 of the rear seat back for the rear seat passenger's comfort. These cushions may be any of the conventional cushions known in the art. In another aspect, the rear seat back 32 includes a plurality of parallel ribs 110 projecting from the rear surface 42 of the rear seat back. The parallel ribs 110 are raised surfaces used to protect the flat portion of the rear surface. The parallel ribs 110 may be designed to closely match the parallel ribs that are typically provided on the bottom surface 22 of the flat bed 20. By providing the ribs 110 at the same height as the ribs on the bottom surface 22 of the flat bed, the height of the bed will remain substantially constant between the flat bed portion and the rear surface of the rear seat back when it is folded to a downward position. As shown in FIG. 5, the rear surface 42 of the rear seat back may also include a central portion 120 for placing the name of the vehicle manufacturer, or other design. The central portion 120 is located between a top set of ribs 110 and a bottom set of ribs 110. Alternately, the portion for placement of the name could be located at any other position on the rear surface of the rear seat back.

The operation of the foldable seat back and retractable window is as follows.

Initially, the rear window glass 60 is fully extended from the rear seat back as shown in FIG. 2. The rear window glass forms a seal so that air, etc. cannot enter the interior of the vehicle. The passenger may rest his/her head against the head rest. If necessary, the passenger's knees can be located in grooves in the back of the front seat, as previously described.

When it is desirable to expand the cargo bed length, the passenger must exit the back seat of the vehicle. The rear window glass 60 is then retracted into the rear seat back 32. The system may include a safety device so that the rear seat back cannot be folded forward until the rear window glass is fully retracted into the rear seat back. This safety device can be in the form of a sensor that senses whether the rear window has been lowered. Alternately, the safety device can include a manual release switch that can be operated by the driver or a passenger of the vehicle.

The rear seat may be folded forward and down by a variety of manual or automatic processes. In a manual method of folding the rear seat forward, the user will typically engage a manual lever such as that shown in FIGS. 4–6 in order to disengage a latch mechanism, and then simply pull on the top portion 44 of the rear seat back to pivot it about pivot point 36. Alternately, instead of using a manual lever, an automatic mechanism may be provided for disengaging the latch mechanism. In an automatic method of folding the rear seat forward, the user presses a button so that the rear seat back is lowered by a gear or cam mechanism within the vehicle seat. Before the rear seat back is pivoted down, the rear seat bottom 34 of the rear seat is folded forward and up about pivot point 38, as shown in FIG. 3, and the rear seat back 32 is folded down and forward about pivot point 36. The head rest 70 should be folded upward and forward so that it will not interfere with the cargo in the cargo area.

With the rear seat folded forward, the rear surface 42 of the rear seat back 34 will serve as an extension of the cargo bed length, thereby substantially increasing the cargo space of the vehicle. In this position, the rear surface 42 and parallel ribs 110 of the rear seat back 32 is substantially flush with the bed surface 22 and corresponding ribs of the bed so that cargo can be slid along the bed surface 22 onto the rear surface 42. The first surface 46 of rear seat bottom 34 now serves as the front wall of the now-extended length cargo bed. The first surface 46 is preferably made of a sturdy durable material, such as those described for the rear surface 42 of the rear seat back 32, that can withstand the wear and tear from the moving of the materials into and out of the cargo bed.

The rear seat back and bottom are preferably configured so that when folded into the second position (shown in FIG. 3), the top portion 44 of the rear seat back 32 closely mates with the first surface 46 of the rear seat bottom 34. The seats should also preferably be configured so that the bottom surface of the extended bed is smooth and does not have significant gaps. The seats can alternately be provided with drainage areas so that any rain or other liquid in the cargo bed area 20 can drain from the vehicle. In one embodiment, the vehicle is provided with seals throughout the vehicle bed, including portions where the vehicle seat back and the cargo bed mate. In this embodiment, a trough in the shape of a gutter is provided under the seat for water or other liquid that is not effectively blocked by the seal. The trough is preferably located immediately below the parting line adjacent the pivot point 36 where the rear seat back rear surface 42 meets with the cargo bed surface 22.

The rear seat back 32 can be returned to the first position (FIG. 2) by any of the manual or automatic processes previously discussed. In one embodiment, a gear or cam mechanism will slowly lift the rear seat back 32 upon pressing of a button. Alternately, the rear seat back 32 can be manually lifted and pivoted about pivot point 36. When the rear seat back is returned to the first position, in one embodiment, the latching mechanism will latch the rear seat back into its initial locked position.

The rear surface 42 of the rear seat back may alternately be provided with slots for the positioning of two-by-fours or other support structures. In such an embodiment, the wall of tail gate 24 will also be provided with a slot or recess. In another embodiment, tie-downs may be provided in the rear surface 42 of the rear seat back. These tie-downs can be in a variety of designs known in the art. In one embodiment, the tie-downs are in the shape of a hemispherical groove in the rear surface with a bar extending across.

An alternative vehicle embodiment is shown in FIGS. 7–10 with parts corresponding to those described in the previous embodiment designated by the same reference numbers to which 200 has been added. In this embodiment, the front and rear passenger areas 212 and 214 of the cab 211 are essentially the same as those of the previously described embodiment. Also the front and rear seats 226 and 230 are similarly arranged except that in this instance, the rear seat back 232 is generally conventional in that it does not carry a retractable window, nor does it function as a rear closure for the cab 211. However, like the embodiment of FIGS. 1–6, the rear seat back 232 is movable about a pivot 236 between an erect seating position, shown in FIG. 7, to a folded down position, shown in FIG. 8, after the rear seat bottom 234 is pivoted upward and forward on its pivot 238.

Figure 10:
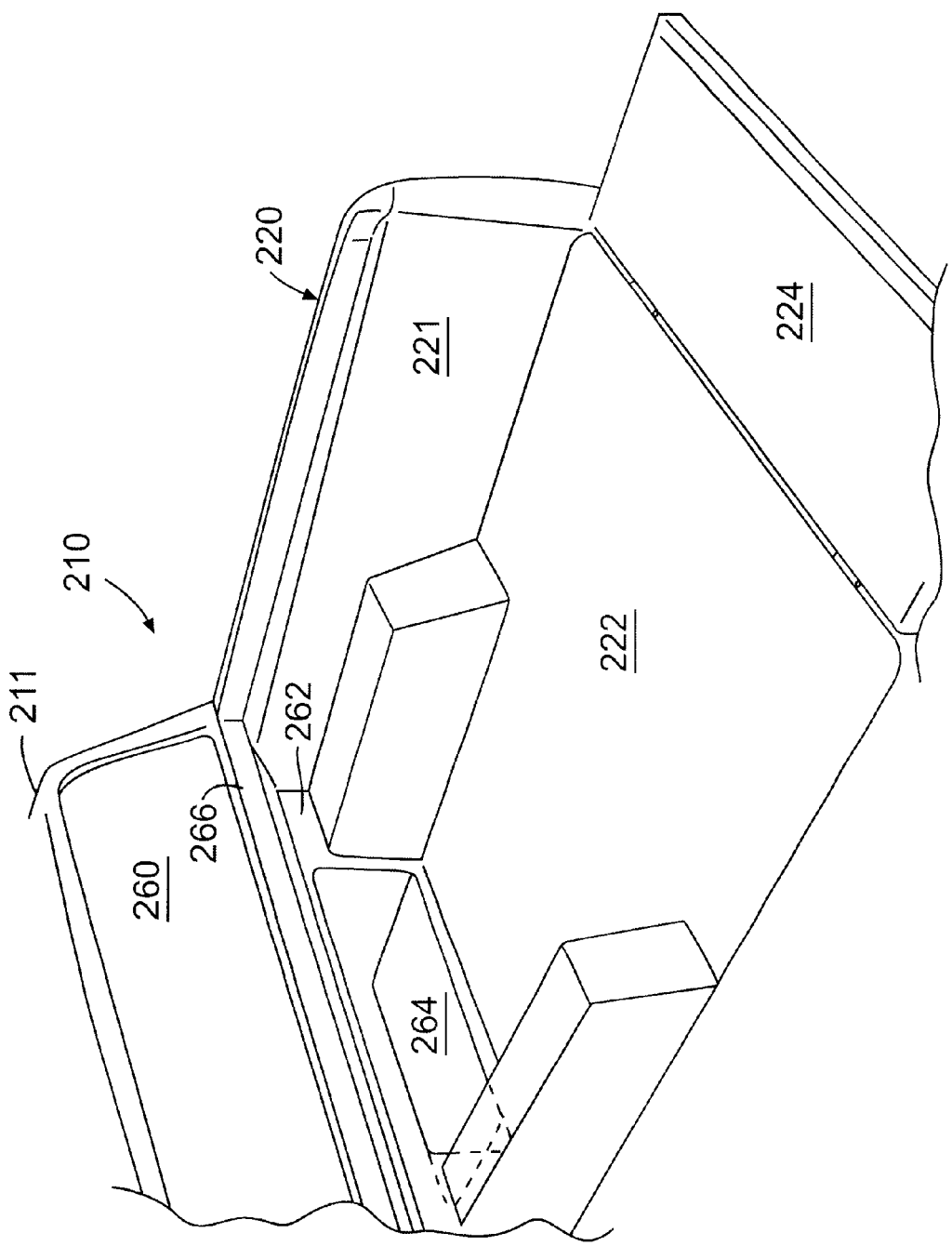
FIG. 10 is a perspective view showing the cargo bed of the vehicle of FIG. 7 with the hinged rear door in an open position.

The embodiment of FIGS. 7–10 differs from that of FIGS. 1–6 in that the rear end of the cab 211 is closed in its upper part by a fixed window 260 and in its lower part by a front bulkhead 262 of the cargo bed 220, in which a hinged door 264 is mounted. The door 264 is hinged at its bottom edge by a pivot 265, and is arranged in the bulkhead 262 to pivot forwardly over the rear seat back 232 after it is folded down to the position shown in FIG. 8. A cross-beam 266 extends across the cargo bed 220 between the sidewalls 221 and serves as reinforcement for the bulkhead 262 and as a bottom frame member for the fixed window 260. As shown in FIG. 10, the open door 264 extends the cargo bed 220 in the rear portion of the passenger cab 211 over the folded rear seat back 232.

Although the above discussion has mainly focused on a hybrid vehicle, the provision of a rear seat with a retractable window is also suitable for use in a regular pickup truck and other vehicles having cargo beds, and is not limited to use in hybrid vehicles. Moreover, although the discussion has also focused on the use of the above design in a rear seat back, the present invention is also suitable in a structure without a seat. For example, the structure previously described as a rear seat back may merely be the back of the passenger compartment of the vehicle, without a seat built into the structure. Many other variations of the present design are also possible.

It will be apparent to those skilled in the art that various modifications and variations can be made in the vehicle seat back and passenger compartment of the vehicle of the present invention and in construction of this apparatus without departing from the scope or spirit of the invention. For instance, the rear of the vehicle may be able to be modified so that the window will function with split fold-down back seats that can be pivoted relative to each other. In this manner, the window for one of the back seats can be retracted into the seat, and the seat folded forward, thus allowing the cargo bed length to be expanded in the portion of the cargo bed length corresponding to the folded down seat. A passenger could remain in the second seat. The back seats could also be configured so that either or both of the back seats can be folded forward at the same time.

In another embodiment of the present invention, a rear window of the vehicle could be hingedly attached to the roof of the vehicle. Prior to folding down the rear seat, the rear window could be pivoted upwards and toward the back of the vehicle. After pivoting the rear window, the rear seat back could be folded down as previously described.

In a further embodiment of the present invention, a removable rear window could be provided, instead of the retractable or fixed rear window shown in the figures. In this embodiment, the rear window could be attached to the rear seat back and walls of the vehicle body. When it is desired to fold down the rear seat, the window can be detached from the rear seat back and vehicle body. Latches or any other type of suitable fastening structures may be utilized.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An automotive vehicle body comprising:
   a passenger cab having front and rear passenger areas, the rear passenger area including a rear end of the passenger cab;
   a cargo bed having a substantially horizontal floor extending rearwardly from an opening in the rear end of the passenger cab;
   a pivotal rear seat back configured to close the opening in the rear end of the cab, the rear seat back being movable between an erect upright position to close the opening and separate the passenger cab and the cargo bed, and a folded position to extend the floor of the cargo bed through the opening in the rear end of the passenger cab; and
   a retractable window extendable into and out of a top portion of the rear seat back when the rear seat back is in the erect upright position,
      wherein the rear seat back is foldable in a forward direction of the vehicle when the retractable window is substantially retracted into the rear seat back, and further wherein the rear passenger area of the passenger cab is suitable for seating a rear passenger against a front surface of the rear seat back when the rear seat back is in the erect upright position.

2. The automotive vehicle body of claim 1, further comprising a rear seat bottom, the rear seat back and the rear seat bottom defining a rear seat in the passenger cab, the rear seat bottom being pivotal between a generally horizontal seating position and a generally vertical position providing a front wall for the cargo bed extended by the rear seat back in the folded position.

3. The automotive vehicle body of claim 1, further comprising a head rest pivotable from a ceiling of the vehicle body.

4. An automotive vehicle body comprising:
   a passenger cab having a rear end;
   a cargo bed having a substantially horizontal floor extending rearwardly from the rear end of the passenger cab;
   front and rear seats in the passenger cab defining front and rear passenger areas respectively, each of the front and rear seats having a seat bottom and a seat back, the rear seat back configured to pivotally close an opening in the rear end of the cab, the rear seat back being movable between an erect upright position to close the opening and separate the passenger cab and the cargo bed, and a folded position to extend the floor of the cargo bed through the opening in the rear end of the passenger cab;

a retractable window in the rear seat back and adjustable between a retracted position within the rear seat back and an extended position projecting from a top edge of the rear seat back when the rear seat back is in the erect upright position; and means supporting the rear seat back for movement between the erect upright position and the folded position with the window in the retracted position, wherein the rear passenger area of the passenger cab is suitable for seating a rear passenger against a front surface of the rear seat back when the rear seat back is in the erect upright position.

5. The automotive vehicle body of claim 4, wherein the rear seat bottom is pivotal between a generally horizontal seating position and a generally vertical position providing a front wall for the cargo bed extended by the rear seat back in the folded position.

6. The automotive vehicle body of claim 4, further comprising a head rest pivotable from a ceiling of the vehicle body.

7. An automotive vehicle body comprising:

a passenger cab having a rear end;

a cargo bed having a substantially horizontal floor extending rearwardly from the rear end of the passenger cab;

a rear seat back pivotal about a first pivot between an erect upright position and a folded position; and a pivoted closure on the rear end of the cab and pivotal about a second pivot spaced apart from the first pivot, the pivoted closure closing off the rear end of the cab when in an erect upright position, thereby separating the passenger cab and the cargo bed, and pivotal about the second pivot in the forward direction of the passenger cab to a folded position when the rear seat back is in a folded position, thereby extending the floor of the cargo bed into the rear end of the passenger cab.

8. The automotive vehicle body of claim 7, wherein the pivoted closure comprises a hinged door.

9. The automotive vehicle body of claim 8, wherein the hinged door can be pivoted about the second pivot when the rear seat back is in the folded position.

10. The automotive vehicle body of claim 7, wherein the rear seat back is suitable for seating a rear passenger against a front surface thereof when the rear seat back is in the erect upright position.

11. The automotive vehicle body of claim 7, further comprising a rear seat bottom, the rear seat back and rear seat bottom defining a rear seat in the passenger cab, the rear seat bottom being pivotal between a generally horizontal seating position and a generally vertical position providing a front wall for the cargo bed extended by the rear seat back in the folded position.

* * * * *